Feb. 4, 1930. T. W. DIKE ET AL 1,745,890
DRIVE AND CONTROL MECHANISM FOR VENEER LATHES AND THE LIKE
Filed Nov. 1, 1926 5 Sheets-Sheet 2

INVENTORS:
Theodore W. Dike and Frank Sanford
by Macleod Calvin Copeland P Dike
Attys.

Feb. 4, 1930. T. W. DIKE ET AL 1,745,890
DRIVE AND CONTROL MECHANISM FOR VENEER LATHES AND THE LIKE
Filed Nov. 1, 1926  5 Sheets-Sheet 3
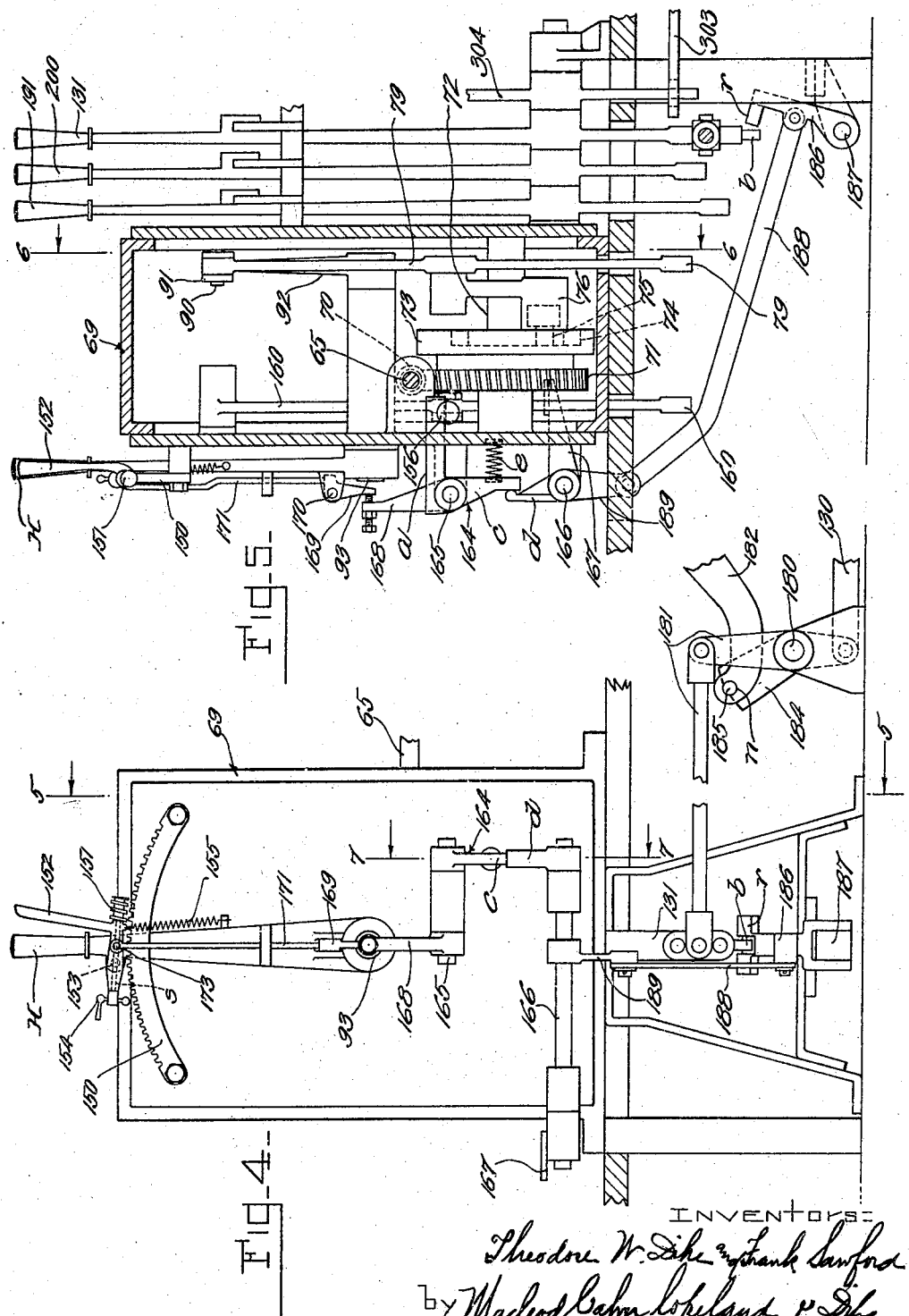

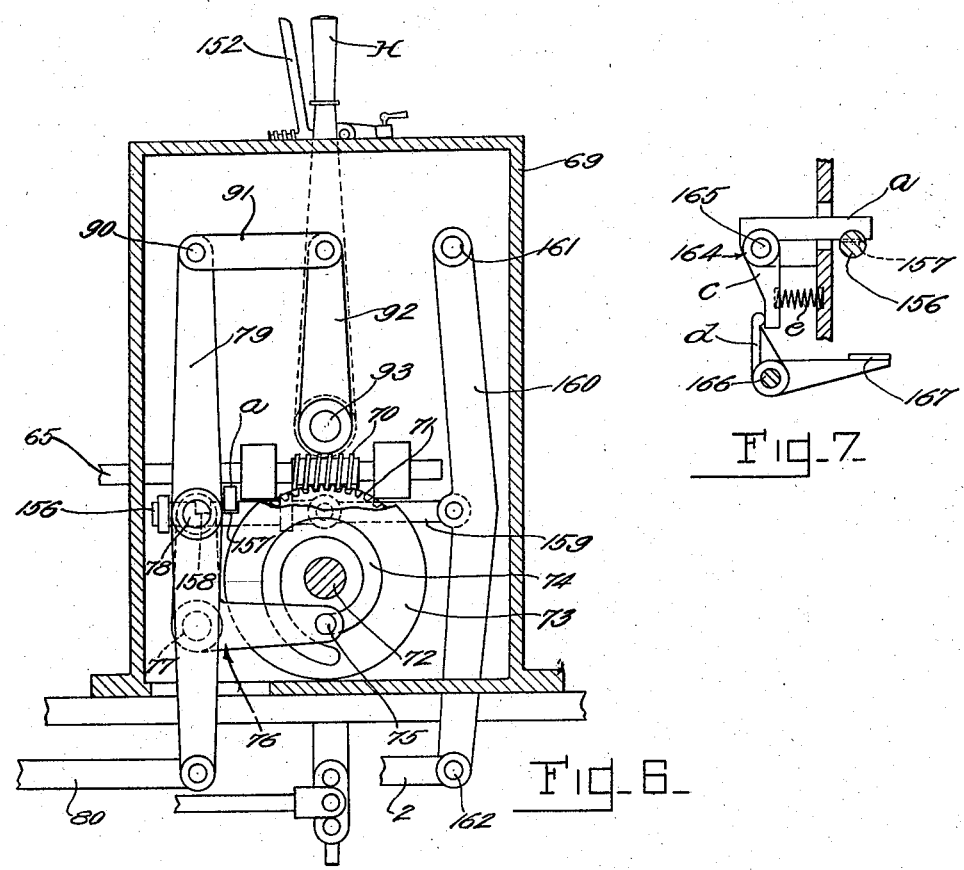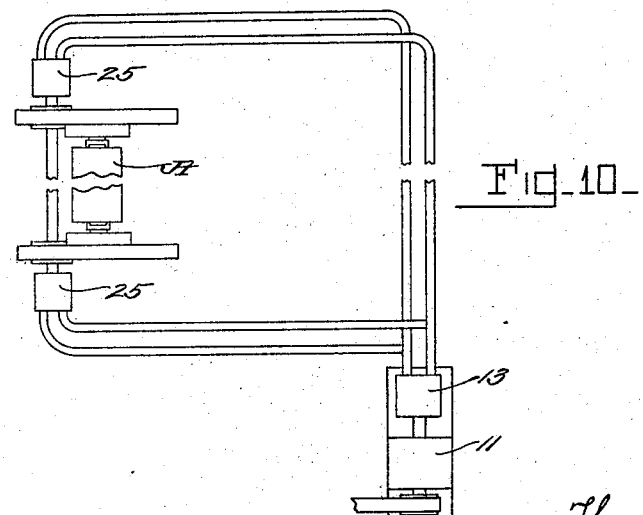

Feb. 4, 1930.  T. W. DIKE ET AL  1,745,890
DRIVE AND CONTROL MECHANISM FOR VENEER LATHES AND THE LIKE
Filed Nov. 1, 1926  5 Sheets-Sheet 5

Inventors:
Theodore W. Dike & Frank Sanford
by Macleod, Kuhn, Copeland & Dike
Attys.

Patented Feb. 4, 1930

1,745,890

UNITED STATES PATENT OFFICE

THEODORE W. DIKE, OF NEW WESTMINSTER, AND FRANK SAWFORD, OF VANCOUVER, BRITISH COLUMBIA, CANADA, ASSIGNORS TO THE LAMINATED MATERIALS COMPANY LIMITED, OF NEW WESTMINSTER, BRITISH COLUMBIA, CANADA, A CORPORATION OF BRITISH COLUMBIA

DRIVE AND CONTROL MECHANISM FOR VENEER LATHES AND THE LIKE

Application filed November 1, 1926. Serial No. 145,664.

Our present invention has for its object an improvement in lathes and similar machines, particularly veneer lathes. The particular objects of the invention will be apparent hereinafter.

Heretofore, veneer lathes have been ordinarily constructed to cause the log to rotate at a substantially constant angular speed, no provision being made to maintain a constant surface or cutting speed. As is well known to those skilled in the art, the best results can be obtained by maintaining a constant cutting speed although this should be variable to afford the most efficient cutting speed according to the kind of wood being cut and the condition of the particular log. If the cutting speed is too slow, it is found that the knife stretches and tears the fibres before severing them and produces a rough, uneven coarse veneer or one which is cracked or splintered at places and therefore seriously weakened. Too low cutting speeds also tend to produce vibration of the log and an objectionable chattering action at the knife. Since the logs from which the veneer for large panels is obtained may differ in size from five feet or more in diameter to about six inches, it will be seen that the surface speed with a constant speed lathe is excessively high when the outer part of a large log is being cut and correspondingly slow as the heart of the log is approached. Heretofore, with lathes adapted to cut large timber, it has been necessary to stop cutting veneer when the log has reached a diameter of from ten to twenty-four inches and use the core for some other purpose such as pulp wood or fuel or to transfer the core to a small, high speed lathe where its diameter can still further be reduced and some additional veneer produced. Either of these methods is wasteful, and the per hour output when cutting small logs on a large lathe is prohibitively small. The saving of diameter is a matter of great importance because of the scarcity of logs suitable to be cut into veneers. A substantial increase in the output per hour when cutting small diameters also tends to increase the available timber supplies by making large quantities of smaller timber available.

Our present invention therefore provides means by which the cutting tool or knife controls the speed at which the driving mechanism rotates the log, the speed of rotation being progressively increased at the rate required to maintain the peripheral speed constant as the diameter of the log is reduced. Means are also provided under the control of the operator by which the rate of speed may be increased or diminished over the entire range so that thereafter the machine will automatically maintain whatever cutting speed is selected as the diameter of the log decreases.

In other words the movement of the cutting knife automatically controls the speed of rotation of the log, and on this automatic mechanism there is superposed a hand control by which the operator can, at will, increase or decrease the cutting speed throughout the entire range, and can do this either at starting or during the progress of the cut.

The lathe embodying our invention can therefore be caused to run at the most efficient cutting speed for the particular quality of the wood regardless of the diameter of the log and therefore will produce a better veneer at all speeds, will produce the veneer more rapidly than heretofore and will cut all sizes of logs within its range of capacity with equal efficiency and will produce more veneer from a given log. In practice we find that the lathe embodying our invention will cut veneer satisfactorily from logs varying in diameter from sixty-two and one-half inches to six inches.

Our invention also has other important advantages. Heretofore, in an attempt to obtain at least a partial control of cutting speed, it has been customary to drive a veneer lathe by means of a variable speed alternating current motor where electricity has been employed. Such motors have been exceedingly uneconomical, particularly when the power factor is considered. For instance, the power factor of an ordinary alternating current variable speed motor operating a veneer lathe at either of the constant angular speeds available with such a drive may be as low as 25% while by employing the mechanism which will be hereinafter described it is possible to use a constant speed uni-directional synchronous motor which not only does not produce the lagging or wattless current which causes low power factor but actually produces a large amount of leading current which tends to correct the power factor for the rest of the plant. This produces a substantial economy in the use of power irrespective of the other advantages.

The lathe embodying our invention is provided with controlling mechanism which is simple and effective so that the operator can give close attention to the character of the log which frequently changes quickly as its diameter diminishes, and can regulate the cutting speed accordingly.

While we have described our invention as applied to a lathe intended for cutting a continuous veneer from large logs it will be understood that the invention is also applicable to other kinds of machines as for instance to metal working lathes, to boring mills and similar types of machines. We do not limit ourselves to the application of our invention to veneer lathes except when expressly stated in the claims.

Our invention also provides mechanism for applying the power to both lathe spindles uniformly and with minimum variations in force and does away with the spur "bull" gears and pinions, which have heretofore been commonly employed. Mechanism is also provided for effectively equalizing the application of the rotating force at both ends of the log which greatly improves the smoothness of operation of the lathe and does away with the chattering cutting action which has resulted in part from the intermittent application of the force through spur gears driven by a common drive shaft, and in part from the torsion and consequent springing of the log when through torsional yielding of the drive shaft the force is momentarily applied at only one end of the log.

Further improvements embodied in our lathe are as follows:

Mechanism whereby small speed adjustments may be obtained to keep the efficiency at the highest possible point.

Mechanism to lock the control lever in neutral position so that quick stops can be made without danger of reversing the machine, and Improved dogging mechanism by which the lathe operator is enabled to operate the dogs more rapidly and conveniently than heretofore.

The invention will be fully understood from the following description when taken in connection with the accompanying drawings, and the novel features thereof will be pointed out and clearly defined in the claims at the close of this specification.

Fig. 4 is a detail of the control mechanism as viewed from the left in Fig. 2.

Fig. 5 is a section on line 5—5, Fig. 4.

Fig. 6 is a section on line 6—6, Fig. 5.

Fig. 7 is a section on line 7—7, Fig. 4.

Fig. 10 is a diagram illustrating a modification of the driving mechanism.

Figure 1:
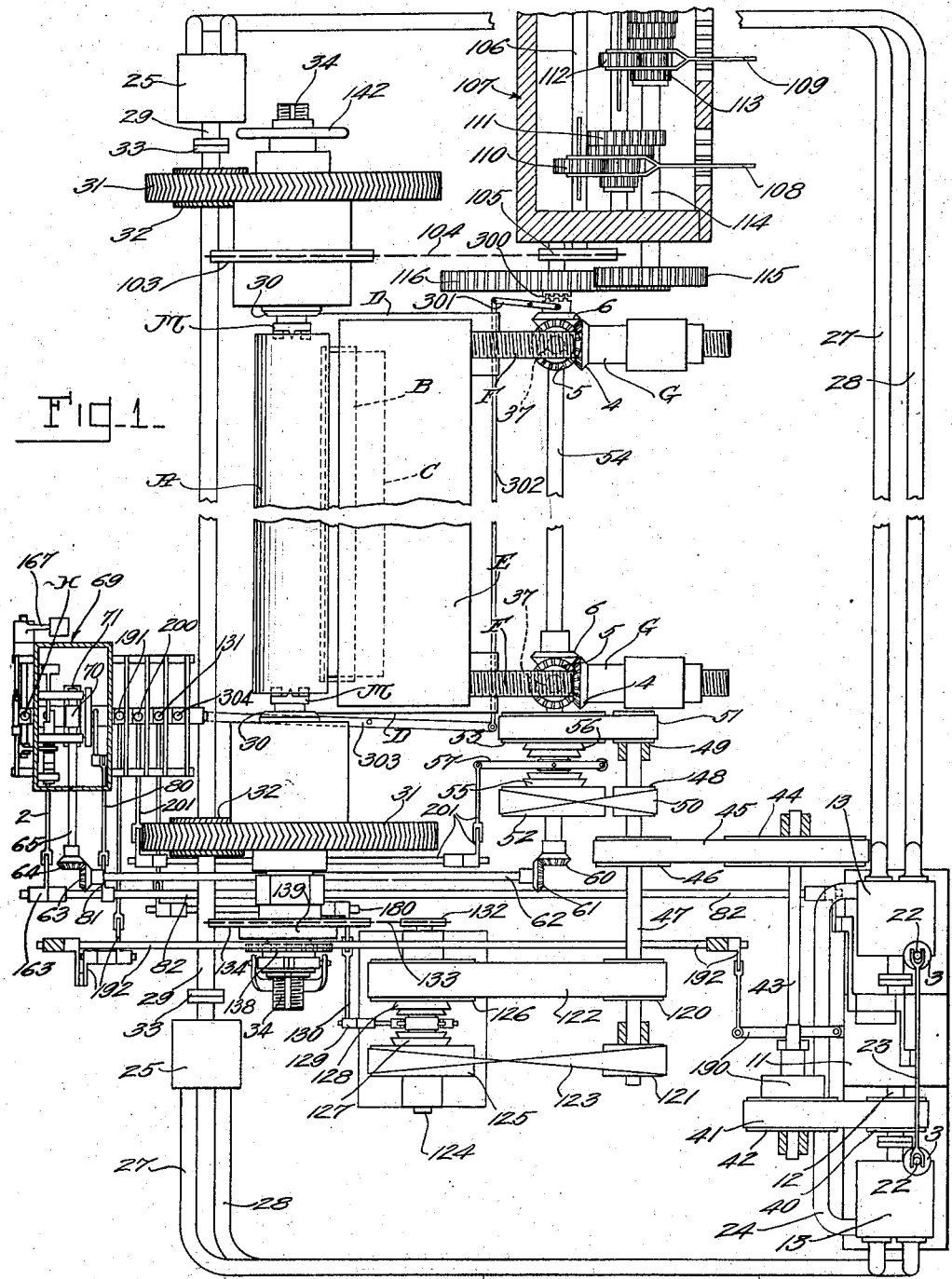
Fig. 1 is a plan view, partly in section, of the machine embodying our invention.

Referring now to the drawings:

At A is shown the log, at B the knife, at C the pressure bar and at E the knife carriage. The lathe is provided with the ordinary frame work D. In the drawings and for clearness of illustration the showing of the frame has been omitted as far as possible. The knife carriage E is fed inward by feed screws F and screw collars G. These parts are of ordinary construction and need not be described in greater detail.

Figure 3:
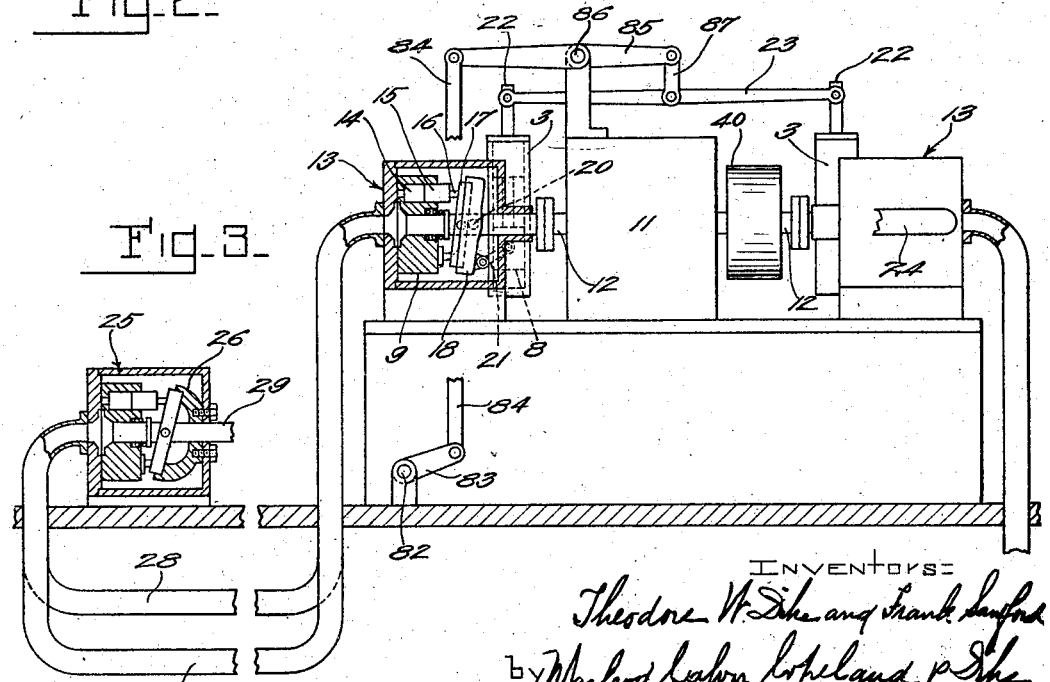
Fig. 3 is a side elevation, partly in section, of the drive unit looking from the left in Fig. 2.

The lathe is driven as a whole by a prime mover 11 which may be assumed to be a constant speed uni-directional synchronous electric motor the armature shaft 12 of which is connected either directly through couplings or through a jack shaft to one or more pumping units 13 or constant speed end of an hydraulic variable speed gear. This device is of well-known construction and can be purchased in the open market and therefore will not be described in detail. The constant speed ends or units, hereinafter referred to as the pumping units of which two are shown in Figure 3 are identical in construction and operation and are essentially constant speed variable output reversible flow hydraulic pumps intended to circulate oil in either direction through a system in which is placed a variable speed hydraulic motor operated by the circulation of oil, and varying in speed according to the amount of oil delivered by the pump and in direction of rotation according to the direction of flow in the system. The pumping units 13, 13, see Fig. 3, each consists essentially of a series of cylinders 14 formed in a disk 9, one of the cylinders being shown in Fig. 3, pistons 15 and piston rods 16 connected to a disk 17. The disk 9 and the disk 17 rotate in unison on a common axis, and the disk 17 is supported against an inclined bearing plate 18 which is pivoted at 20 in the casing. Any change in the inclination of the bearing plate 18 varies the stroke of the pistons and consequently the amount of oil delivered by the pump unit. When the disk 17 is at right angles to the shaft, the pistons will be stationary relative to the cylinders and the pump will deliver no oil. The disk is then said to be in neutral position. When the disk passes the neutral position the direction of flow of oil in the system is reversed, and consequently the direction of the hydraulic motors actuated by the flow of oil. The inclination of the disk is controlled by a plunger 8 slidably mounted in a cylinder 3 and connected to said disk by a link 21. The plunger is raised or lowered by a rod 22 connected to one end of an equalizing lever 23. The other end of this equalizing lever is connected to the control plunger 8 of the other pumping unit 13. Therefore as the equalizing lever is raised or lowered both pumping units are controlled simultaneously and the output of the units varied accordingly.

From the foregoing it will be seen that the constant speed non-reversible synchronous motor 11 can run at constant speed yet the volume of oil which will be delivered by the pumping units will be varied in accordance with the angular position of their bearing disks 18. The two pumping units are also connected by a pipe 24 (see Fig. 1) to equalize the pressure in the two pumping units and thereby prevent any variation between them.

At each end of the lathe is located the other half of the mechanism ordinarily known as the Waterbury gear. These are conveniently called hydraulic motors and are adapted to operate in either direction depending on the direction in which the oil flows. In the drawings these motors are as a whole designated 25. Each motor is a structure similar to the pumping unit already described except that the bearing disk 26 (see Fig. 3) is fixed and not movable, and is at the position to cause the pistons to make their maximum stroke. Each motor 25 is connected by pipes 27 and 28 with its corresponding pumping unit 13 so that the oil delivered by the pumping unit 13 will pass through the corresponding motor 25 and cause the shaft 29 of each motor to rotate with a speed determined by the volume of oil which is delivered by the pumping unit. The result of this mechanism is that the electric motor 11 running at constant speed will operate the shafts 29 of the hydraulic motors 25 at varying speed which speed is controlled by the position of the bearing disks 18 in the pumping units 13.

The two hydraulic motors 25—25 rotate the log spindles 30—30 by means of large herringbone gears 31—31 and small herringbone pinions 32—32 these pinions being on the shafts 29—29. The shaft 29 (see Fig. 1) is conveniently constructed as a single member running lengthwise of the machine and is connected by a coupling 33 at either end to the hydraulic motors 25—25. If at any time it is desired to drive the lathe from one hydraulic motor only, one of the couplings may be disconnected. It will be obvious from the foregoing description of the operation of the hydraulic gear that the full power of the constant speed prime mover is available at the hydraulic motor 25 regardless of the rotation speed of the motors. Therefore, the torque which can be exerted by the motors is inversely as the speed of rotation, which is very desirable in veneer lathe work. Any other type of variable speed gear which has similar characteristics may of course be employed.

The herringbone gears 31—31 and pinions 32—32 constitute an important part of our invention. We have found by experience that if veneer lathes are driven by spur gears, a periodically varying pressure is applied by the log to the knife, and that this causes chattering, splintering or tearing of the fibre at low speed. Machine cut spur gears reduce this action somewhat but do not eliminate it entirely. When herringbone gears are employed, the pressure is substantially constant and not intermittent, a much smoother cut is produced and the serious troubles incident to chattering are eliminated. This elimination of vibration also makes it possible to run at much higher speeds than hitherto which has important advantages.

The mechanism by which the feed screws F are rotated and consequently by which the knife B and pressure bars C are fed toward the centre of the log at a predetermined rate necessary to cut any of the several thicknesses of veneer for which the machine is adapted will now be explained. This mechanism is substantially the same as that shown in the Letters Patent of the United States issued to Theodore W. Dike, on December 28, 1926, No. 1,611,896, to which reference may be made for fuller explanation. On one of the lathe spindles 30 is a sprocket 103 (Fig. 1) which drives a chain 104 which itself drives another sprocket 105. This operates the driving shaft 106 of a variable speed transmission contained within a box 107 which is conveniently referred to as the thickness gear box. This gear box 107 has two operating handles 108 and 109 by means of which changes of gear between the sets of gears 110 and 111 and 112 and 113 respectively can be effected. The driven shaft of the gear box is designated 114 and drives a gear 115 meshing with a gear 116 on the end of the cross shaft 54, to which further reference will be made. The gear box is so constructed that a large number of changes may be effected. Each of these changes varies the speed of rotation of the feed screws with reference to the speed of rotation of the log spindles and therefore correspondingly increases or diminishes the speed at which the knife and pressure bar are advanced toward the center of the log and consequently the thickness of the veneer which is produced. It will be understood, of course, that there is one speed for each thickness of veneer.

The mechanism by which the feed screws are moved rapidly under the hand control of the operator as for instance after finishing one log and beginning another, will now be described. At 300 is shown a clutch which connects the cross shaft 54 which operates the feed screws F—F to the mechanism of the thickness gear box 107. This clutch 300 is operated by a lever 301 connected by a link 302 to a hand lever 303 having a handle 304 located at some convenient point. By moving this lever the operator of the machine can disconnect the thickness gear box when he needs to move the knife in and out by the mechanism which will now be described. On the armature shaft 12 of the electric motor 11 is a pulley 40 (see Figs. 1 and 2) connected by a belt 41 to a pulley 42 loosely running on a countershaft 43 which may be located on the ceiling of the room where the machine is placed. The pulley 42 may be fixed to the countershaft 43 at the will of the operator by clutch mechanism, generally indicated at 190 and actuated by a hand lever 191 (see particularly Fig. 1) conveniently located in a control box 69, to be hereinafter more fully described, and intermediate connections indicated at 192. The countershaft 43 also carries a pulley 44, which by a belt 45 drives a pulley 46 on a countershaft 47. On this countershaft there are two other pulleys 48 and 49 which by a crossed belt 50 and an open belt 51 drive the pulleys 52 and 53 respectively. These pulleys 52 and 53 are loose on the shaft 54 previously referred to and can be connected thereto alternately by means of cone clutches 55, 56 of ordinary construction. These clutches are operated by a clutch arm 57 and serve to give to the shaft 54 a direct or reverse drive, to feed the knife in or out rapidly according to the will of the operator.

The clutch arm 57 is actuated by a hand lever 200 (see particularly Fig. 1) conveniently located on the control box 69, above referred to, and by intermediate connections indicated at 201.

On the shaft 54 are two pinions 6—6 which mesh with bevel pinions 7—7 on the lower ends of vertical shafts 37—37 the upper ends of which carry bevel pinions 5—5 which mesh with bevel pinions 4—4, forming part of the screw collars G—G on the feed screws F—F. These parts move the knife carriage E in or out according to the direction of rotation.

It will thus be seen that when cutting veneer the knife carriage is driven inwardly at a predetermined rate of speed, the drive being from one of the lathe spindles through the thickness gear-box, and at other times under the hand control of the operator may be moved in or out at a rapid rate by the train of mechanism above described, the clutch 300 being at this time disengaged so that the thickness gearing will be stationary.

The automatic and hand controlled mechanism by means of which the speed of the hydraulic motors 25 is varied automatically as the log diminishes in size to maintain a constant surface cutting speed and by which the operator may increase or decrease the cutting speed will now be described. It will be understood that this mechanism is intended to increase progressively the speed of rotation of the log as its diameter diminishes and to produce this increase in speed of rotation at a rate which will maintain a constant surface or cutting speed regardless of the diameter of the log and further will permit the operator to increase or diminish the cutting speed within the range provided to suit the conditions of work. For instance if a cutting speed of two hundred feet per minute is required, the operator will set the control lever at the proper point and thereafter the control mechanism will automatically maintain this cutting speed as the log diminishes in diameter. It will also be understood that if the operator desires to have a higher or lower cutting speed, he can accomplish this by moving the control lever and thereafter the automatic mechanism will maintain the new speed regardless of the diameter of the log. It will further be understood that the operator can change the speed at any time during the cutting of the log, increasing it or diminishing it according to the character of the wood fibre or condition of the log which is being cut.

Figure 2:
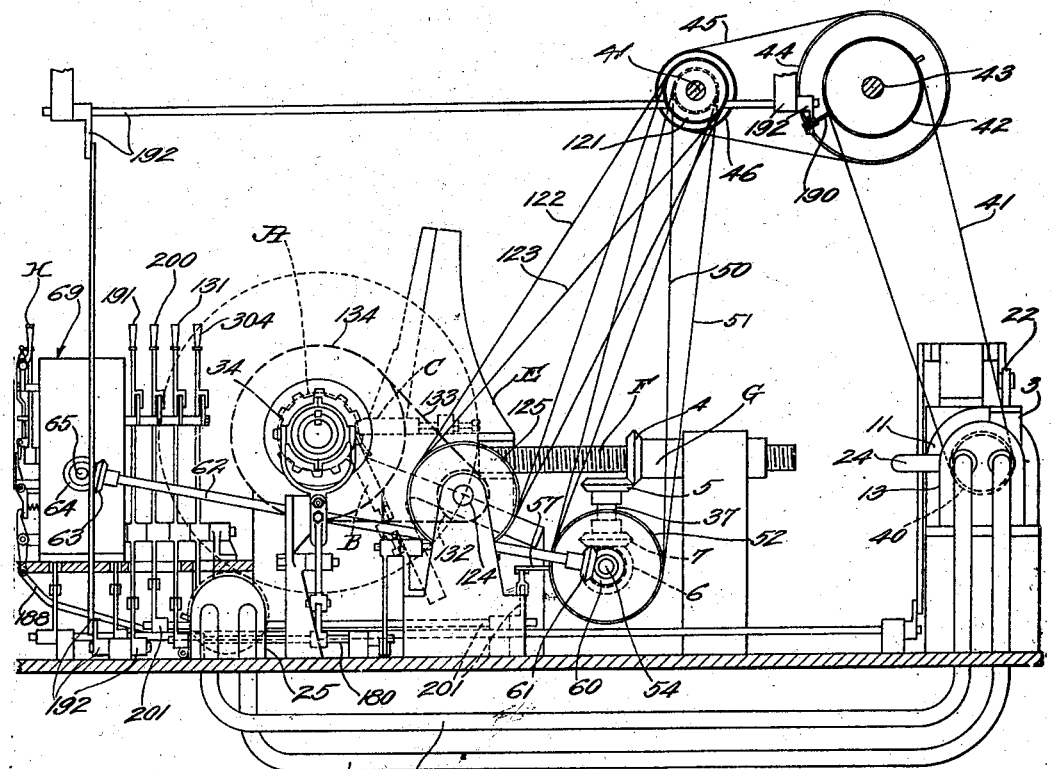
Fig. 2 is an end elevation of the machine shown in Fig. 1.

The mechanism by which the surface speed of the log is increased or decreased consists of the control box 69 and hand lever H shown in detail in Figs. 4, 5 and 6, connections from the shaft 54 to the control box, and connections from the control box to the equalizing lever 23, see Fig. 3, by means of which the bearing disks 18 in the pumping units 13 are tilted. On the shaft 54, see Fig. 1, is a pinion 60 meshing with a pinion 61 on the shaft 62. The shaft 62 carries at its other end a pinion 63 meshing with a pinion 64 on a shaft 65. The shaft 65 enters the control box 69 and on its inner end carries a worm 70 (see Figs. 5 and 6) meshing with a worm gear 71. The train of mechanism described reduces the speed of rotation so that the worm gear 71 rotates very slowly and in fact makes about one revolution during the entire time required for the knife carriage to travel from its extreme outer position to its extreme inner position. The worm gear 71 is mounted on a shaft 72 which carries a spiral cam 73 having a cam groove 74. In the cam groove 74 is a cam roller 75 mounted on one arm of a bell crank 76. The bell crank 76 is pivoted at 77 to the control box and has its other end pivoted at 78 to a floating lever 79. The upper end of the floating link 79 is connected by a pivot 90 to a link 91 which is itself connected to the upper end of an arm 92, the lower end of which is pivoted at 93 to the control box. This pivot 90 acts as a fulcrum for the floating link 79 when the speed of the lathe is automatically varied to maintain a constant surface cutting speed but may itself be moved when the operator wishes to change the rate of speed. The lower end of the floating link 79 is connected to a rod 80, the other end of which is connected to an arm 81 on a rock shaft 82, see Fig. 1, which extends from the front to the back of the machine. The rear end of the rock shaft 82 that is the right-hand end, as shown in Fig. 1, carries an arm 83 connected by a link 84 to one end of a lever 85 pivoted at 86 to the frame of the machine (see also Fig. 3). The other end of the lever 85 is connected by a link 87 to the equalizer 23 by means of which the rods 22 and plungers 8 which control the pumping units 13 are moved.

From the foregoing it will be seen that as the knife carriage is fed in toward the centre of the log, the spiral cam 73 is slowly revolved and this movement causes the equalizer 23 to move the two plungers 22 and thus increase the inclination of the disks 18, correspondingly increasing the output of the pumps and the speed of rotation of the log spindles. This movement is continuous and progressive and free from steps or abrupt graduations. As already explained the spiral cam 73 is laid out so that the surface speed of the log will be constant. Obviously any shape of cam may be used to obtain any automatic increase or decrease or variation in speed as may be desired.

It will also be understood, that except for starting or stopping the machine, or for varying the speed from one cutting speed to another, the machine furnishes its own energy that is, the energy necessary for the predetermined acceleration required to maintain a constant cutting speed is furnished by the machine itself and therefore places no burden on the operator. If, however, the work of changing speeds is found to be heavy, as may be the case with large lathes, a suitable power mechanism may be provided which while under the control of the operator will relieve him of any heavy effort.

To increase or diminish the peripheral speed of the log, the hand lever H is provided, said lever being located on the outside of the control box and terminating at its upper end in a handle which is readily accessible to the operator. The lower end of said lever is connected to the pivot 93 which as previously stated is connected by the arm 92 and link 91 to the upper end of the lever 79. Movement of the hand lever H therefore is transmitted through lever 79 which for this section is fulcrumed at 78 and moves the equalizer 23 and increases or diminishes the output of the pumping units irrespective of and without interfering with the action of the spiral cam 73.

The hand lever H, see Fig. 5, is provided with a latch cooperating with a quadrant 150 which is secured to the control box as indicated in Fig. 4 and is provided with teeth cut in its periphery for engagement with a small worm 151 secured to one end of a shaft s which is carried by the latch 152 pivoted at 153 to the control lever. The other end of the shaft s has secured thereto a small handle 154 by which the worm may be rotated. A spring 155 attached at one end to the lever and at the other end to the latch tends to hold the worm in engagement with the teeth on the quadrant. When the control lever H is moved to start the lathe, the spring 155 snaps the worm 151 into engagement with the teeth on the quadrant and the parts are held in this position. Quick movement for speed changes, therefore, may be obtained by pressing the latch 152 to the handle H in the usual manner which releases the worm 151 from engagement with the quadrant and permits the handle to be moved to the required position. Small increases and decreases in speed are made by rotating the worm 157 by means of the handle 154. This gives a micrometer adjustment to the parts so that small changes in speed can be obtained when the operator sees that the men behind the lathe can handle the veneer a little faster or when it needs to come off a little slower. This is a feature which makes for increased efficiency because the limiting factor is now the speed with which the material can be handled and not the cutting speed as was formerly the case.

To assist the operator to find the neutral position for the control lever H, and to release the worm 151 from quadrant 150 at the neutral position so that there will be no damage to the control mechanism when the knife carriage is being moved by the quick return of hand feed, and at the maximum speed position to prevent the cam causing the machine to exceed the predetermined maximum speed, locking mechanism controlled by a foot pedal is provided whereby the control lever is locked in place when the lathe is stopped and the control is in neutral, and it can only be released by depressing the foot pedal. This mechanism comprises a locking bar 156 (see Figs. 4, 5, 6 and 7) slidably mounted in bearings in the control box and provided with notches 157 and 158. The locking bar 156 is connected by a link 159 to an arm 160 intermediate the ends thereof, one of which is pivotally secured at 161 to the control box while the other is connected at 162 to a link 2, the opposite end of which is connected to an arm 163 mounted on the rock shaft 82 previously referred to. Yieldingly held in engagement with the notched bar 156 (see particularly Figs. 5 and 7) as by a spring e is one arm a of a bell crank 164, said arm being forced by the spring e into one of the notches 157 or 158. The bell crank 164 is secured to a rock shaft 165 and its other arm c is engaged by an arm d secured to one end of a second rocker shaft 166, each of said rocker shafts being mounted in bearings on the outside of the control box. The other end of the rocker shaft 166 forms a foot pedal 167. Secured to the rocker shaft 165 previously referred to is an upwardly extending arm 168 which engages one arm of a second bell crank 169 pivoted at 170 to lugs on the control box. The other arm of the bell crank 169 engages the lower end of a rod 171 slidably mounted in bearings on the control lever H and pivotally connected at its upper end to the latch 152 as indicated at 173.

When the lathe is stopped the control lever is held in neutral position, as shown in Figs. 4, 5, 6 and 7 of the drawings, by the engagement of the arm a of the bell crank 164 with the notch 157 in the locking bar 156. This position of the parts prevents any movement of the rock shaft 82 and therefore holds the tilting plates 18 of the pumps in vertical, i. e., neutral, position and prevents oil from being pumped to the motors 25. To start the lathe and cause it to run at the desired peripheral speed, the operator grasps the handles of the control lever and latch, pressing them together, and steps on the foot pedal, depressing it and thereby releases the bell crank 164 from engagement with the locking bar 156. The control lever is then moved along the quadrant until the desired speed has been reached at which time the operator releases the latch 152 and the worm 151 is forced into engagement with the quadrant thereby maintaining the cutting speed at a constant rate to the limit of the cut. By rotating the worm slightly the speed can be changed as required. When a predetermined maximum speed of rotation has been reached, the arm a of the bell crank 164 drops into the notch 158 of the locking bar 156. This disengages the worm 151 from the quadrant so that thereafter the cam is ineffective to increase the speed of the machine, but on the contrary keeps the machine at the predetermined maximum speed until the knife carriage is set back.

Figure 8:
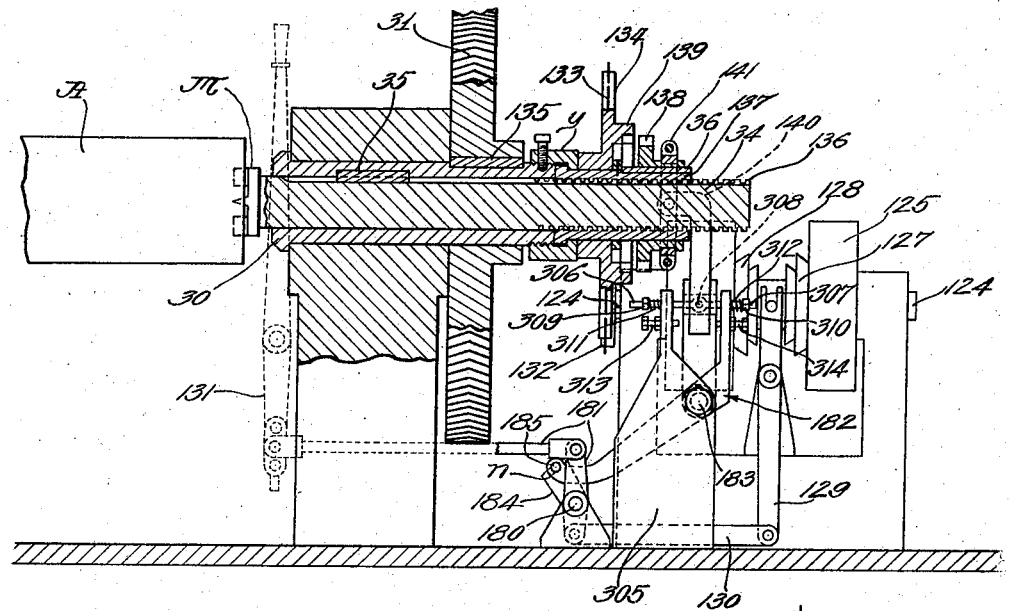
Fig. 8 is a detail in front elevation and partly in section of the dogging mechanism.
Figure 9:
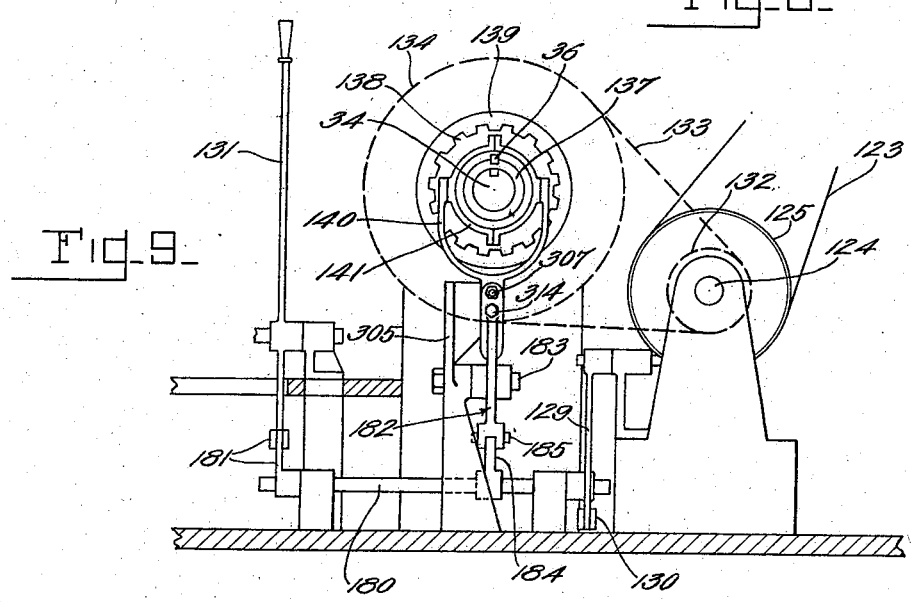
Fig. 9 is an end elevation of the parts shown in Fig. 8.

The dogging mechanism by which the dogs in the lathe spindles are forced into and out of the log will now be described. On the overhead countershaft 47 are two pulleys 120 and 121 (see Figs. 1 and 2) which drive an open belt 122 and a crossed belt 123 respectively. On a countershaft 124 are two loose pulleys 125 and 126 on which operate the crossed belt 123 and the open belt 122 respectively. Between the two pulleys 125 and 126 (see also Figs. 8 and 9) are cone clutches 127 and 128 of ordinary construction, being capable of connecting alternately the corresponding loose pulley to the shaft. By this means an ordinary reversing gear is provided so that the countershaft 124 can be driven in either direction at the will of the operator. The clutches 127 and 128 are controlled by a lever 129, link 130, shaft 180 and intermediate connections 181 to the dogging lever 131 (see also Fig. 5). The countershaft 124 carries a sprocket 132 connected by a chain 133 to a sprocket 134 which carries a female clutch member 139.

Journalled in each of the main bearings of the lathe is a sleeve 30, on the outer end of which is mounted one of the herringbone gears 31 rotatably secured therewith by a key 135. Slidably mounted in each of the sleeves 30 but rotatably connected therewith by a key 35 is the log spindle 34 which is provided at its inner end with a dog M and at its outer end with screw threads indicated at 136 in Fig. 8. Rotatably secured by a collar y to the outer end of the sleeve 30 at the right-hand end of the lathe is a nut 137 which engages the threaded portion 136 of the log spindle 34 and is adapted to cooperate therewith to move said spindle lengthwise of the lathe. The nut 137 is itself rotatably secured to a male clutch member 138 by a key 36 (see Figs. 8 and 9). This male clutch member is slidable on the nut 137 and is adapted to engage the female clutch member 139 carried by the sprocket 134 which is loosely mounted on said nut. The clutch member 138 is operated by a fork 140 and collar 141 which slides the clutch member lengthwise of the nut 137 and thereby positively connects or disconnects the sprocket 134 with said nut so that the nut will revolve and move the log spindle lengthwise of the lathe. The fork 140 is pivoted at 183 and is yieldingly operated by a lever 182 also pivoted at 183 to the frame of the machine. The arm of the fork 140 is located between the upper end of the lever 182 and the upper end of a fixed member 305. Two sliding rods 306 and 307 respectively connected by a pin 308 to the fork 140 pass through the upper ends of the lever 182 and the fixed member 305 and are slidable therein. Each of the rods 306 and 307 are screw threaded and are provided with nuts 309 and 310 respectively, and between the nuts and the adjacent faces of the respective members are springs 311 and 312, of which the latter spring is much the stronger. Adjustable stops 313 and 314 on each side of the fork are also provided. The movement of the lever 182 is produced by an arm 184 rigidly secured to the shaft 180 and provided with a notch n at its free end (see particularly Fig. 4) which engages a pin 185 fixed to the outer end of the lever 182 (see particularly Fig. 8). When the clutch members 138 and 139 are disengaged, the parts being then in the position shown in Fig. 8, and the lower end of the lever 182 is released by the arm 184 moving its notch out of contact with the pin 185, the spring 311 pulls the rod 306 and consequently the fork 140 to the left causing the clutch members to be brought into contact with a yielding pressure and to interlock as soon as the moving member has moved far enough so that the teeth register. When the arm 184 moves the lever 182 in the opposite direction to that already described, to disengage the clutch, it first compresses the spring 312 but does not move the fork 140 as long as the clutch members are under heavy load due to the forcing of the dog into the log; but when this pressure is released the spring 312 pulls the fork 140 to the right releasing the clutch members and again compressing the spring 311. By this arrangement, the clutch is yieldingly operated and there is no danger of breakage notwithstanding the pressure on the clutch teeth or their lack of registration.

At the opposite end of the lathe the log spindle 34 is provided with a hand wheel 142 for adjusting the dogs for different lengths of log. It will thus be seen that the dogs M may be forced into or out of the log at the will of the operator.

To prevent the possible operation of the dogging mechanism when the cutting is taking place, interlocking mechanism between the speed control lever H and the control lever 131 of the dogging mechanism is provided. As shown in Figs. 4 and 5 the dogging lever 131 is formed at its lower end with a projection $b$ adapted to be engaged when the lathe is running by the forked upper end $r$ of an arm 186 pivoted to the frame of the machine at 187. The arm 186 is connected intermediate its ends by a link 188 and an arm 189 with the rock shaft 166 of the control locking mechanism previously referred to. When the speed control lever H is in neutral position and the lathe stopped as shown in Figs. 4 and 5, the forked end $r$ of the arm 186 is disengaged from the dogging control lever 131 and the dogging mechanism can be put into operation. When, however, the operator steps on the foot pedal 167 to release the control lever H to start the lathe, the dogging control lever 131 is immediately locked in position by engagement with the forked end of the arm 186 due to its connections with the rock shaft 166 on which the pedal is mounted. Therefore, and while the dogging mechanism is being operated, the lathe cannot be started because the control lever H is locked.

From the foregoing it will be seen that the entire control of the lathe with the exception of the variable speed transmission is centered at one place in a control box conveniently located for the operator. All speeds from zero to maximum both forward and reverse are obtained by a single operating lever, i. e. the lever H, and movement of this lever gives a wide range of cutting speeds which the above described mechanism automatically holds constant regardless of the varying diameter of the log. Changes in the speed can be made instantly and the new speed will also be automatically maintained until it is in turn altered. Small increases or decreases of speed can also be made which makes for fine adjustment and therefore keeps the efficiency at the highest possible point. Furthermore the neutral position of the parts is defined and the control lever is automatically stopped at this point and therefore cannot be thrown into reverse without first coming to rest and stopping the machine. Also the lathe cannot be accidentally started by bodily contact with the starting lever. Levers controlling the rapid movement of the feed screws and dogging mechanism are also mounted on the control box, as is the lever for connecting the drive for these mechanisms to the main power shaft.

In a modified form of drive shown in Fig. 10 only one pumping unit 13 is employed, both hydraulic motors 25 being piped up to this unit as shown.

The operation of the machine is as follows: It will be assumed that the machine is in its normal condition after finishing a log, that is, the knife is forward and close to the lathe spindles and the prime mover (electric motor 11) and pumping units 13 are running, but are in neutral position so that no oil is being delivered to the hydraulic motors 25, 25. The machine is therefore at a standstill except for the movement of the prime mover and pumping units.

The operator first runs the knife back to its retracted position. To accomplish this he moves lever 191 (see Figs. 1, 2 and 5) and thereby operates clutch 190 which connects the shaft 43 to the constantly running pulley 42. This sets the shaft 47 in motion. Next the operator moves the reverse feed lever 200 toward the top of the sheet in Fig. 1, thereby causing the clutch 56 to engage the pulley 53 and start the rotation of the shaft 54. This actuates the feed screws F, F and withdraws the knife. When the knife has reached the proper position the operator puts the reverse feed lever 200 into neutral position thereby stopping the movement of the knife, but leaving the overhead shaft 47 still running.

The log A is then placed in position by a crane or other mechanism not shown. The left hand dog 30 (see Fig. 1) is then adjusted by the hand wheel 142 to centre the log properly. Under ordinary conditions the length of log cut is practically the same over long periods, consequently the left-hand dog 30 is adjusted for this length of log by the hand wheel 142 when the first log of this length is cut and thereafter the adjustment of the left-hand end of the latter does not have to be changed until a change is made to another length of log. After the log is in place and the left-hand dog properly positioned, the operator then moves the dogging lever 131. This movement of the dogging lever 131 does two things. First, it causes the toothed clutch member 138 to enter the corresponding clutch member 139, and, second, by further movement it engages the cone clutch on shaft 124 and causes the sprocket 132, chain 133, and sprocket 134 to rotate to force the dog M into the log. Since the screw threads are of relatively small pitch the force exerted on the dog is great and the dogging can be accomplished easily and quickly. There is no danger to the machine as the clutch member 128 will slip before an excessive strain is exerted.

The log is now in position and the knife is then brought up to the log by again operating the feed lever 200, but this time in the opposite direction. The operator now proceeds to slab or bark the log to get it in proper condition for cutting veneer. This he does usually by feeding the knife in by hand under the control of the hand lever 200, the clutch 300 being disconnected. Under some conditions, however, the clutch 300 may be connected and the change speed gear set by the manipulation of levers 108 and 109 so that the knife will be given a very rapid feed to bark or slab the log, a special set of gears being provided for this purpose as explained in the United States patent of T. W. Dike already referred to.

The operator then sets the machine in motion, stepping on the foot pedal 167, which moves the link 188 and fork r to lock the dogging lever 131 and at the same time lifts the latch a out of the notched locking bar 156 freeing the control lever H. The operator then grasps the control lever H depressing the latch 152 and lifting the worm 151 out of the threads in quadrant 150 and then moves the control lever H to the left as shown in Fig. 6.

The forward movement of the control lever H, operating through the train of connections already described, moves the tilting plates 18 of the pump units 13, 13 out of vertical position first setting the pumps in operation and then gradually increasing the amount of oil delivered by the pumps as the angle of the plates increases. This produces a flow of oil through the pipes 27 and 28 to the hydraulic motors 25 and causes the herringbone pinions 32 to rotate. These in turn rotate the herringbone gears 31 and turn the log. Owing to the substantial incompressibility of the oil, the response of the hydraulic motors 25 to movement of the control lever H is practically instantaneous. The speed of rotation and the power necessary to revolve the log is controlled by the amount of oil delivered by the pumping units 13.

After a few revolutions of the log during which the bark is removed and the log trued up, if the slabbing or barking has been done under hand control by use of the lever 200, that lever is placed in neutral position and the log allowed to continue to rotate. The operator then has his assistant reset the change speed gear by moving the handles 108 and 109, for the combination of gears necessary to cut the particular thickness of veneer for which the log or at least the first portion of the log is best adapted if a change in thickness from that at which the machine was previously set is required. The operator then moves the speed control handle H to the position which will give to the log the best speed to cut that thickness of veneer from the particular log. The speed will be determined considerably by the character of the log and its condition as to moisture. The operator soon acquires experience which enables him to determine nicely the maximum speed at which the particular log can be cut to produce the thickness of the veneer chosen and of the best quality. He can adjust the speed of the log accurately by revolving the worm 151 by the handle 154. Having set the speed control lever to the desired speed the machine proceeds with the cutting of the log.

As the knife B is fed toward the centre of the log the cam 73 is slowly rotated by the gears 66, 67, worm 70 and worm gear 71. This moves the cam follower 75 slowly outwardly from the axis of the shaft 72 and by so doing moves the train of connections already described and the equalizer 23 which tilts the plates 18 in the pumping units 13 and increases the output of the pumping units and consequently the speed of the hydraulic motors 25. This rotates the log more rapidly. It will be understood that this increase in the speed of rotation of the log is just sufficient to maintain a constant peripheral speed at the knife. If at any time the condition of the log changes requiring a greater or less speed the operator can make the necessary change by moving the speed control lever H to any extent desired. It will also be understood that if after proceeding for a certain distance with the cutting of the log it appears to him best to cut another thickness of veneer he can do this without stopping the lathe, first throwing out clutch 300 by the lever 304, then having his assistant change the thickness of the cut by manipulating the handles 108, 109 of the thickness gear box, while at the same time the operator sets the lever 154 for the proper speed for the new thickness of veneer or condition of the log. Frequently during the cutting of a log it will be necessary to make a quick stop to release a chip which has jammed against the pressure bar or to chop out a ringsplit or other unsound portion of the log which would be likely to cause trouble. Whenever any of these emergencies arise the operator can instantly stop the lathe by pulling control lever H sharply towards the neutral position when the locking bar 156 previously described will instantly drop into the neutral notch 157. In such cases, owing to the characteristics of the hydraulic drive the stop will be made extremely quickly but without any objectionable shock, as the action of control lever H as it moves towards the neutral position progressively reduces the output of the hydraulic pumps. The braking effect under these conditions is remarkably smooth and even when a large log weighing as much as a ton is being revolved at high speed, it can be brought to a stop in a fraction of a second without shock or strain to the mechanism.

During the cutting of the log and as the speed of rotation increases, the movement of the cam follower 75 and connections moves the locking bar 156 slowly to the right as shown in Fig. 6. When the maximum speed has been reached the locking finger $a$ drops into the maximum speed notch 158, and thereafter the log continues to rotate at this maximum speed. When the log has been cut down to the smallest possible core, the operator releases the clutch 300 which stops the forward feed of the knife carriage, and then steps on the foot treadle 167 which releases the control lever H from the maximum speed notch 158, and then brings the control lever back to neutral position.

The operator then steps on the treadle 167 lifting the finger $a$ out of the notch 158 in the locking bar 156 and then moves the feed lever 200 toward the top of the sheet in Fig. 1 as originally described. This connects the shaft 54 to the overhead line shaft 43 and withdraws the knife at the same time resetting the cam, the locking bar and locking finger and leaves the machine in position to receive another log. It will be understood of course that the cam 73 always maintains a fixed position relative to the position of the knife and that the two parts are positively connected so that the cam is always rotated in one direction or the other as the knife is moved in or out toward the centre of the log.

What we claim is:

1. The improved control means for a lathe including work spindles, a tool, and means for moving the tool toward the work, comprising a cam moved by the feeding movement of the tool with relation to the work spindles, a variable output unit driven at substantially constant speed by a source of power, a variable speed motor driven thereby and turning the lathe spindles, and connections operated by the cam to control the output of the unit in accordance with changes in position of the tool, said connections including a floating lever, and hand operated means for changing the position of its fulcrum and thereby to change the effectiveness of the cam on the variable output unit.

2. The improved control means for a lathe including work spindles, a tool, and means for moving the tool toward the work, comprising a cam moved by the feeding movement of the tool with relation to the work spindles, a variable output hydraulic unit driven at substantially constant speed by a source of power, a variable speed hydraulic motor driven thereby and turning the lathe spindles, and connections operated by the cam to control the output of the unit in accordance with changes in position of the tool.

3. The improved lathe operating means which includes a constant speed electric motor, a variable output pump driven by said electric motor, two variable speed hydraulic motors each acting on a spindle at one end of the log in the lathe, means to vary simultaneously the amount of fluid delivered to each of said hydraulic motors, and connections between the said motors to equalize the flow to the said motors, whereby the pressure applied by the motors to each end of the log will be equal.

4. In a machine of the character described, the combination of a prime mover, a constant speed variable output unit, a variable speed motor driven thereby, a lathe spindle driven by said variable speed motor, a cutting knife, means for moving the cutting knife toward the axis of the lathe spindle, control mechanism to vary the output of the unit, and a cam moved by the means which moves the knife, and connections operated by the cam to vary the output of the unit in accordance with changes in position of the knife.

5. The improved control means for a lathe including work spindles, a tool, and means for moving the tool toward the work, comprising a cam moved by the feeding movement of the tool with relation to the work spindles, a pumping unit driven at substantially constant speed and delivering a variable quantity of fluid, an hydraulic motor driven at varying speeds by the fluid delivered by said pumping unit, and connections operated by the cam to vary the output of the pumping unit and consequently the speed of the hydraulic motor.

6. The improved control for a lathe including work spindles, a tool, and means for moving the tool toward the work, comprising a cam moved by the feeding movement of the tool with relation to the work spindles, a pumping unit driven at substantially constant speed and delivering a variable quantity of fluid, an hydraulic motor driven at varying speeds by the fluid delivered by said pumping unit, connections operated by the cam to vary the output of the pumping unit and consequently the speed of the hydraulic motor and manually controlled means to vary the rate at which the cam changes the output of the pumping unit.

7. The improved drive for a lathe or similar machine having a movable work tool, comprising a prime mover running at substantially constant speed, a variable output pump, a variable speed hydraulic motor driven by said pump, connections from the motor to the lathe spindles, a knife or other tool operating on the work, means for feeding the knife, and connections between the knife feeding means and pump operated by the movement of the knife to vary the output of the pump.

8. The improved drive for a lathe or similar machine comprising a prime mover running at substantially constant speed, a variable output pump, a variable speed hydraulic motor, connections from the motor to the lathe spindle, a knife or other tool operating on the work, means for feeding the knife, and connections between said means and said pump operated by the movement of the knife to vary the output of the pump.

9. The improved drive for a lathe or similar machine comprising a prime mover running at substantially constant speed, a variable output pump, a variable speed hydraulic motor, connections from the motor to the lathe spindle, a knife or other tool operating on the work, means for feeding the knife, and connections between said means and the pump including a cam operated by the movement of the knife to vary the output of the pump.

10. The improved drive for a lathe or similar machine having a movable work tool and comprising a prime mover running at substantially constant speed, means operated by the prime mover to feed the tool, a variable output pump operated by the prime mover, a variable speed hydraulic motor, connections from the motor to the lathe spindle, means between said first mentioned means and pump and including a cam operated by the movement of the work tool to vary the output of the pump, and hand actuated means independent of the cam also to vary the output of the pump.

11. The improved operating means for a veneer lathe which comprises a constant speed electric motor, two variable output pumping units driven by the said motor, two variable speed hydraulic motors, each driven by one of said pumping units, and equalizing connections to equalize the pressures delivered to the said hydraulic motors by the said pumping units, each of said pumping units itself driving one of the lathe spindles.

12. The improved operating means for a veneer lathe which comprises a constant speed electric motor, two variable output pumping units driven by said electric motor and each provided with control plungers, two variable speed hydraulic motors, each driven by one of the said pumping units and itself rotating one of the lathe spindles, an equalizing member connecting the said control plungers and means acting on said equalizing member to vary the speed of rotation of the lathe.

13. The improved veneer lathe and operating means therefor including a lathe spindle, a knife, means for feeding the knife toward the axis of the lathe spindles, said means being driven by the lathe spindle and including a change speed gear to change the thickness of the veneer produced, a prime mover running at constant speed, a variable output pumping unit driven by the said prime mover, a variable speed hydraulic motor driven by the said pumping unit and itself rotating the lathe spindles, a cam moved by the knife, feeding means and connections between the cam and the said variable output pumping unit to vary the output and consequently the speed of the lathe spindles in accordance with the position of the knife.

14. The improved veneer lathe and operating means therefor including a lathe spindle, a knife, means for feeding the knife toward the axis of the lathe spindles, said means being driven by the lathe spindle and including a change speed gear to change the thickness of the veneer produced, a prime mover running at constant speed, a variable output pumping unit driven by the said prime mover, a variable speed hydraulic motor driven by the said pumping unit and itself rotating the lathe spindles, a cam moved by the knife, feeding means, connections between the cam and the said variable output pumping unit to vary the output and consequently the speed of the lathe spindles in accordance with the position of the knife and hand controlled means acting on the connections between the said cam and the said pumping unit.

15. The improved veneer lathe which includes lathe spindles, driving means for the lathe spindles, automatic means controlled by the movement of the lathe knife to vary the speed of rotation of the lathe spindles, hand controlled means itself controlling said automatic means, and interlocking mechanism to render the hand controlled means ineffective when a predetermined speed has been reached 16. The improved veneer lathe which includes lathe spindles, driving means for the lathe spindles, knife, means controlled by the movement of the knife to vary the speed of rotation of the lathe spindles, a hand lever itself controlling said automatic means, and connections between said automatic means and said hand lever to release the hand lever when a predetermined point has been reached.

17. The improved veneer lathe which includes lathe spindles, driving means for the lathe spindles, a knife, automatic means controlled by the movement of the knife to vary the speed of the lathe spindles, hand controlled means for starting, stopping the machine and varying its speed, interlocking mechanism connected to said hand controlled means to prevent the operation of said hand controlled means, and a foot pedal to release said interlocking means.

18. The improved veneer lathe which includes lathe spindles, driving means for the lathe spindles, a knife, automatic means controlled by the movement of the knife to vary the speed of rotation of the lathe spindles, a hand lever controlling said automatic means, dogging mechanism for the lathe spindles, a lever controlling the dogging mechanism for the lathe spindles, interlocking mechanism to prevent movement of the hand controlled lever, a foot pedal to release said interlocking means, and connections between the foot pedal and the dogging lever to prevent movement of the dogging lever except when the hand control lever is in neutral position.

19. The improved veneer lathe which includes means for rotating the lathe spindles at a varying rate of speed, a hand control to govern the movement of the lathe spindles, power operated dogging mechanism, a hand control for said dogging mechanism, and interlocking mechanism between the said controls to prevent the operation of one train of mechanism while the other is in operation.

20. The improved veneer lathe including lathe spindles and dogs thereon, hand operated means for moving the dog lengthwise on one lathe spindle, hand controlled power operated means for moving the other dog lengthwise on its lathe spindle, means for rotating the lathe spindles, and interlocking means to prevent the operation of the power operated dogging means when the lathe spindles are rotating or vice versa.

21. The improved veneer lathe and operating means therefor including a lathe spindle, a knife, means for feeding the knife toward the axis of the lathe spindle, means operated by the knife to vary the speed of rotation of the lathe spindles, hand controlled means to vary the speed of rotation of the lathe spindles, independent manually controlled power operated means for moving the knife toward or away from the axis of rotation of the lathe spindles, dogging mechanism, and levers for controlling the several mechanisms said levers being in juxtaposition with each other for convenient operation.

22. The improved veneer lathe and operating means therefor including a lathe spindle, a knife, means for feeding the knife toward the axis of the lathe spindle, means operated by the knife to vary the speed of rotation of the lathe spindle, hand controlled means to vary the speed of rotation of the lathe spindles, independent manually controlled power operated means for moving the knife toward or away from the axis of rotation of the lathe spindles, dogging mechanism, and a single control station at which is located the several levers for controlling the speed control, the knife movement and the dogging mechanism.

23. In a machine of the character described, a lathe spindle, power driven means for rotating the lathe spindle, control mechanism to regulate the speed of the driving means, a moving cam, a cam follower, connections from the cam follower to the control mechanism said connections including a lever, a movable fulcrum for said lever, and hand operated means to change the position of said movable fulcrum.

24. In a machine of the character described, a lathe spindle, power operated means for rotating the lathe spindle, controlling means to regulate the speed of the driving means, a knife, power operated means for moving the knife toward the lathe spindle, a cam, means actuated by said knife, moving means for moving said cam, a cam follower, connections from the cam follower to the controlling means, said connections including a lever, a movable fulcrum for said lever, and a hand lever for changing the position of said movable fulcrum.

25. In a machine of the character described, a lathe spindle, power driven means for rotating the lathe spindle, controlling mechanism to regulate the speed of the driving means, a knife, power operated means to move the knife toward and from the lathe spindle, a cam, mechanism actuated by the knife operating means and including a change speed gear to move said cam at different rates of speed, a cam follower, connections from the cam follower to the controlling mechanism, said connections including a lever, a movable fulcrum for said lever, and a hand lever to change the position of said movable fulcrum.

In testimony whereof we affix our signatures.

THEODORE W. DIKE.
FRANK SAWFORD.